United States Patent
Lee

(10) Patent No.: US 7,385,567 B2
(45) Date of Patent: Jun. 10, 2008

(54) APPARATUS AND METHOD FOR PROCESSING GRAY SCALE IN DISPLAY DEVICE

(75) Inventor: Jun Hak Lee, Soowon-si (KR)

(73) Assignee: LG Electronics Inc., Seoul (KR)

( * ) Notice: Subject to any disclaimer, the term of this patent is extended or adjusted under 35 U.S.C. 154(b) by 638 days.

(21) Appl. No.: 10/988,547

(22) Filed: Nov. 16, 2004

(65) Prior Publication Data

US 2005/0110714 A1    May 26, 2005

(30) Foreign Application Priority Data

Nov. 26, 2003  (KR)  ............... 10-2003-0084401

(51) Int. Cl.
*G09G 3/28*  (2006.01)
*G09G 5/10*  (2006.01)

(52) U.S. Cl. ........................ 345/63; 345/690
(58) Field of Classification Search ................ 345/63, 345/596, 690–693; 348/574
See application file for complete search history.

(56) References Cited

U.S. PATENT DOCUMENTS

| | | | | |
|---|---|---|---|---|
| 6,069,609 | A * | 5/2000 | Ishida et al. | 345/596 |
| 6,791,516 | B2 * | 9/2004 | Kang | 345/63 |
| 2003/0006994 | A1 * | 1/2003 | Suzuki | 345/596 |
| 2004/0181727 | A1 * | 9/2004 | Ballard | 714/742 |

* cited by examiner

*Primary Examiner*—Amr Awad
*Assistant Examiner*—Randal Willis
(74) *Attorney, Agent, or Firm*—KED & Associates, LLP

(57) ABSTRACT

An apparatus and method for processing a gray scale in a display device is provided. In the gray scale processing method, a video data is randomly error-diffused by using random coefficients, and the error-diffused video data is dithered by using average picture level (APL) masks, thereby enhancing a gray scale expression and minimizing an error diffusion noise.

18 Claims, 6 Drawing Sheets

APPARATUS AND METHOD FOR PROCESSING GRAY SCALE IN DISPLAY DEVICE

BACKGROUND OF THE INVENTION

1. Field of the Invention

The present invention relates to a display device, and more particularly, to a gray scale processing apparatus and method capable of enhancing a gray scale expression and minimizing an error diffusion noise.

2. Description of the Related Art

Recently, a plasma display panel (PDP), which facilitates fabrication of a large-sized panel, has come into notice as a flat panel display. The PDP reproduces pictures by adjusting the respective gas discharge periods of pixels depending on digital video data.

FIG. 1 is a perspective view illustrating a structure of a discharge cell in the related art PDP.

Referring to FIG. 1, the discharge cell of the PDP includes a sustain electrode pair 12A and 12B formed on an upper substrate 10 and a data electrode 20 formed on a lower substrate 18.

The sustain electrode pair 12A and 12B each have a double-layer structure of a transparent electrode and a metal electrode. The sustain electrode pair 12A and 12B are divided into a scan electrode 12A for supplying a scan signal for address discharge and a sustain signal for sustain discharge, and a sustain electrode 12B for supplying a sustain signal alternating with the scan electrode 12A. The data electrode 20 is formed to intersect with the sustain electrode pair 12A and 12B, and supplies a data signal for address discharge.

An upper dielectric layer 14 and a protective layer 16 are stacked on the upper substrate 10 on which the sustain electrode pair 12A and 12B are formed. The upper dielectric layer 14 and a lower dielectric layer 22 accumulate charges generated by discharge. The protective layer 16 prevents damage of the upper dielectric layer 14 by sputtering of plasma particles during the discharge and increases an emission efficiency of secondary electrons. Accordingly, a driving voltage applied from the outside can be lowered by the upper and lower dielectric layers 14 and 22 and the protective layer 16.

The lower dielectric layer 22 is formed on the lower substrate 18 where the data electrode 20 is formed. A barrier rib 24 is formed on the lower dielectric layer 22 with the data electrode 20 interposed therebetween. A phosphor layer 26 is formed on surfaces of the lower dielectric layer 22 and the barrier rib 24. The phosphor layer 26 includes a red (R) phosphor layer, a green (G) phosphor layer and a blue (B) phosphor layer. The phosphor layer 26 separates a discharge space to thereby prevent ultraviolet rays generated by gas discharge in the discharge space from leaking toward its neighboring discharge space. The phosphor layer 26 is radiated by ultraviolet rays generated by gas discharge to thereby emit R, G and B visible rays. The discharge space is charged with inert gases for gas discharge.

Although only one discharge cell is shown in FIG. 1, the PDP can also include a plurality of discharge cells arranged in matrix form.

A discharge cell is selected by address discharge of the data electrode 20 and the scan electrode 12A, and the selected discharge cell maintains discharge by sustain discharge by the sustain electrode pair 12A and 12B. During the sustain discharge, the phosphor 26 is radiated by ultraviolet rays generated in the selected discharge cell and thereby emits R, G and B visible rays. Accordingly, the discharge cell represents a gray scale by adjusting a sustain discharge period, namely the frequency of a sustain discharge according to video data. Combination of 3 discharge cells respectively coated with R, G and B phosphor layers 26 enables representation of a color of one pixel.

As an exemplary method of PDP driving method, there is an ADS (address and display separated) driving method that drives a PDP in such a way that an address period is separated from a display period, namely, a sustain period. The ADS driving method divides one frame 1F into a plurality of sub-fields SF1 through SF8 corresponding to respective bits of video data. Each of the sub-fields is then subdivided into a reset period RPD for initialization of a discharge cell, an address period APD for selection of a discharge cell, and a sustain period SPD for maintenance of the selected discharge cell's discharge. Different weights are given to sub-fields during the sustain period SPD, and the sustain periods are combined according to video data, whereby a gray scale is represented.

The PDP uses an error diffusing method so as to enhance an gray scale expression.

The error diffusing method calculates quantization error data of digital video data by using the Floyd-Steinberg error diffusing filter, applies different weights according to the calculated quantization error data and then diffuses the error to neighboring pixels.

For example, if an error diffusing operation about a current pixel P5 is performed as shown in FIG. 3, the error diffusing method gives a weight 1/16 to a pixel P1 neighboring the current pixel P5, a weight 5/16 to a pixel P2, a weight 3/16 to a pixel P3, and a weight 7/16 to a pixel P4, and thereby calculates error diffusion coefficients about the respective pixels P1 through P4. Thereafter, the error diffusing method generates a carry signal by adding the calculated error diffusion coefficients and then obtains a current pixel value by adding the carry signal to a current pixel value P5.

However, the error diffusing method has a problem in that error diffusion coefficients (that is, weights) about neighboring pixels are constantly set and repeated at every line and at every frame, whereby an error diffusing pattern is generated.

Further, the prior art error diffusing method has a limitation in a gray scale expression of video data.

SUMMARY OF THE INVENTION

Accordingly, the present invention is directed to an apparatus and method for processing a gray scale in a display device that substantially obviates one or more problems due to limitations and disadvantages of the related art.

An object of the present invention is to provide a gray scale processing apparatus and method capable of increasing a gray scale expression and minimizing an error diffusion noise.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for processing a gray scale in a display device includes the steps of: randomly error-diffusing a video data by using random coefficients; and dithering the error-diffused video data by using average picture level (APL) mask.

In another aspect of the present invention, an apparatus for processing a gray scale in a display device includes: a random error diffusing block for randomly error-diffusing a video data by using random coefficients; and a dithering block for dithering the error-diffused video data by using average picture level (APL) mask.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
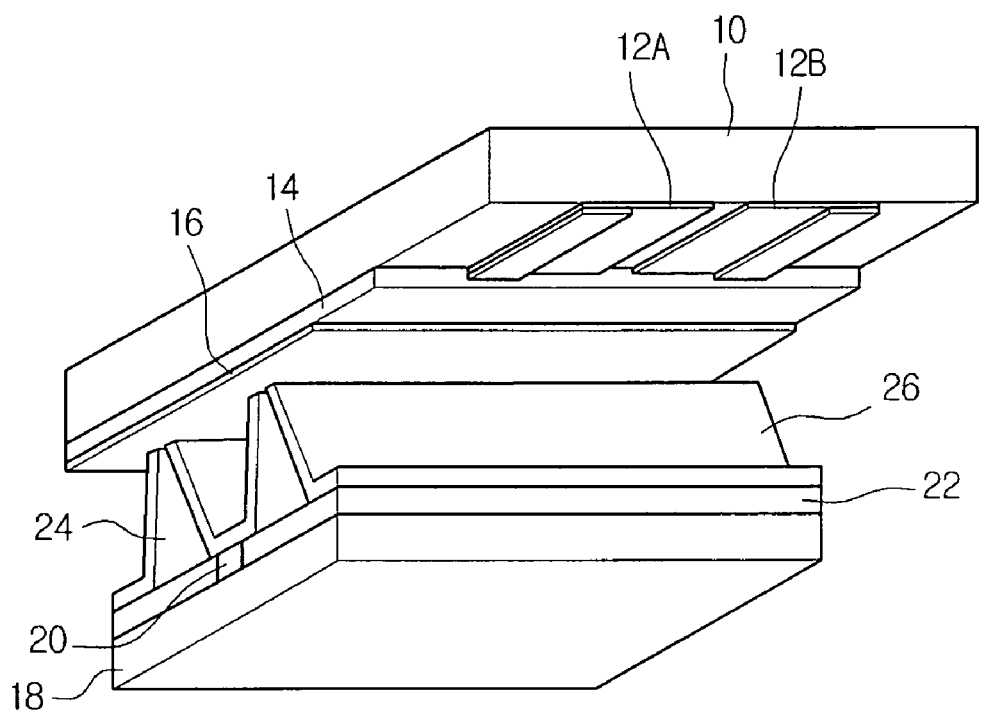
FIG. 1 is a perspective view illustrating a structure of a discharge cell in the related art PDP.
Figure 2:
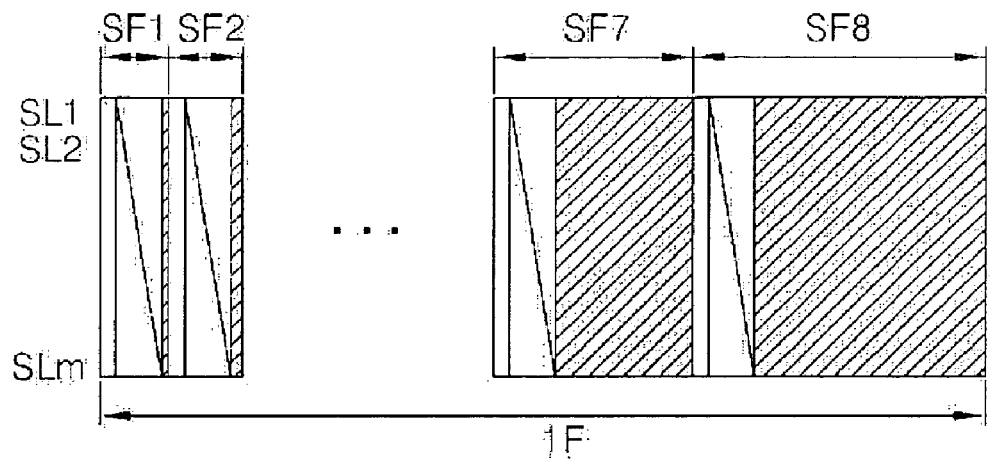
FIG. 2 is an exemplary view illustrating a structure of sub-fields in one frame.
Figure 2:
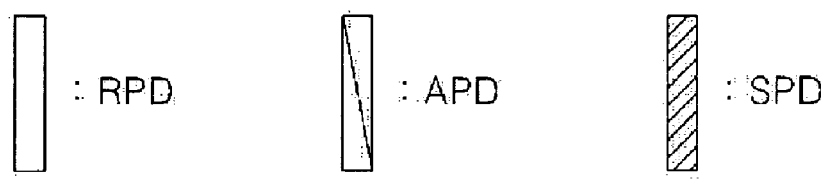
Figure 3:
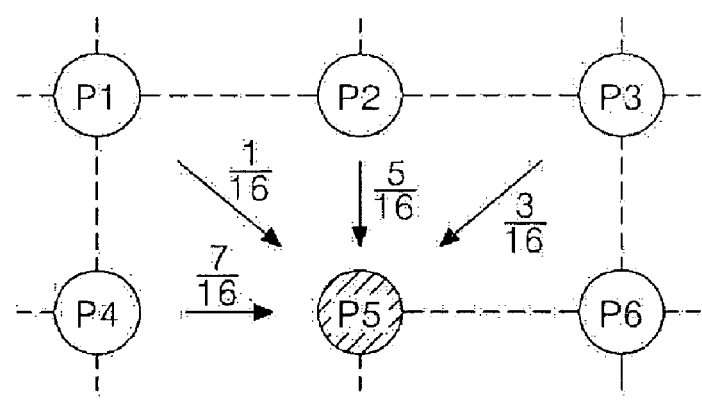
FIG. 3 is a view illustrating the related art error diffusion method.
Figure 4:
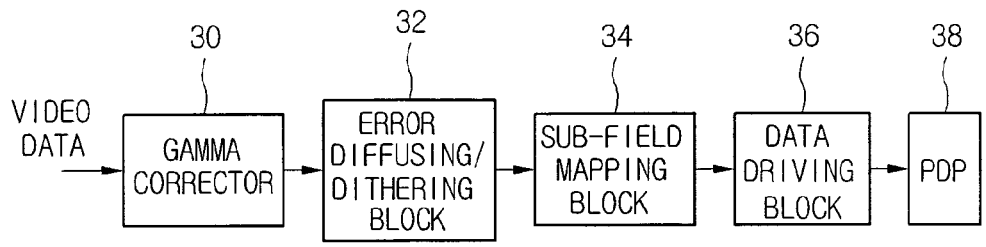
FIG. 4 is a schematic block diagram illustrating a gray scale processor of a PDP according to an embodiment of the present invention.

FIG. 4 is a schematic block diagram illustrating a gray scale processor of a PDP according to an embodiment of the present invention.

Referring to FIG. 4, the gray scale processor includes a gamma corrector 30, an error diffusing/dithering block 32, a sub-field mapping block 34 and a data driving block 36, which are connected between a video data input line and a PDP 38.

Digital video data that was gamma-corrected to be adapted to a luminance characteristic of a cathode ray tube (CRT), namely pixel values that is to be provided to respective pixels, is inputted to the gamma corrector 30 from the outside. The gamma corrector 30 inversely gamma-corrects the inputted pixel values to thereby cause a linear luminance characteristic according to a pixel value to be linear.

Figure 6:
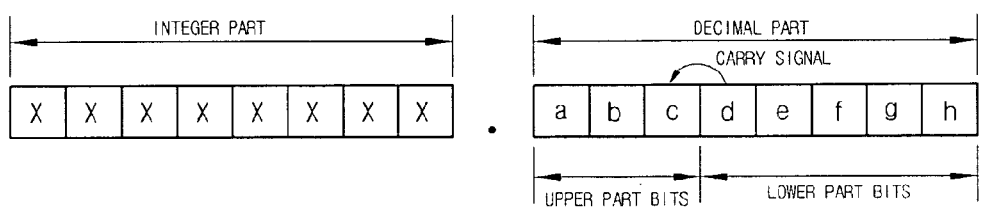
FIG. 6 is a diagram illustrating a bit structure of video data outputted from a gamma corrector shown in FIG. 4.

For example, the gamma collector 30 outputs an inversely gamma-corrected pixel value corresponding to an input pixel value by using a preset look-up table so that a luminance characteristic according to a pixel value follows a 2.2 gamma curve. In this case, each of pixel values outputted from the gamma corrector 30 is composed of an integer part and a decimal part. For example, if an 8-bit pixel value is inputted to the gamma corrector 30 as shown in FIG. 6, the gamma corrector 30 outputs a 16-bit inversely gamma-corrected pixel value composed of an 8-bit integer part and an 8-bit decimal part. At this time, the 8-bit decimal part is composed of upper part bits used for random error diffusing and lower part bits used for random dithering. Of course, when a more increase of gray scale expression is required, more upper part bits and more lower part bits can be used.

The error diffusing/dithering block 32 corrects each of the pixel values outputted from the gamma corrector 30 by error diffusing and dithering to thereby increase a gray scale expression and decrease the number of bits of pixel values. That is, the error diffusing/dithering block 32 error-diffuses the inversely gamma-corrected pixel values by using a first random coefficient, and then dithers the error-diffused pixel values by using a second random coefficient. Here, the error-diffusion of the inversely gamma corrected pixel values through the first random coefficient generates a carry signal. The so-generated carry signal is added to upper part bits of a decimal part of a pixel value prior to a dithering process.

In this manner, the addition of the first and second random coefficients in the error diffusing and dithering can prevent an error diffusion pattern caused by a constant error diffusion coefficient from occurring. Also, the error diffusing/dithering block 32 performs a random error diffusing by using lower part bits of a decimal part of a pixel value used in a dithering operation, thereby enabling rather more gray scale expression through subdivision of a step interval between dithering patterns. An operation of the error diffusing/dithering block 32 will be described in detail later.

The sub-field mapping block 34 maps each of pixel values outputted from the error diffusing/dithering block 32 to a predetermined sub-field pattern.

The data diving block 36 latches input data that is divided on a bit basis according to a sub-field pattern outputted from the sub-field mapping block 34, and provides the latched data to a corresponding data electrode of the PDP 38 on a line basis during the period while one horizontal line is driven.

The PDP 38 includes a data electrode and sustain electrodes (for example, scan electrode and sustain electrode) that intersect the data electrode with a discharge space being interposed therebetween. Accordingly, a discharge cell having the discharge space corresponding to a sub-pixel is formed at an intersection between the data electrode and the sustain electrodes.

Whenever a scan electrode of sustain electrodes is driven during the address period of each sub-field, the PDP 38 selects discharge cells which is to be turn-on by address discharge according to data provided from the data driving block 36 to a data electrode. The PDP 38 makes the selected discharge cells maintain discharge during the sustain period of each sub-field by driving the sustain electrodes. In this case, since the number of sub-fields constituting one frame is decreased as many as the number of bits of video data is decreased by the error diffusing/dithering block 32, a sufficient address period can be obtained whereby the PDP 38 can be driven only by a single-scan method.

Figure 5:
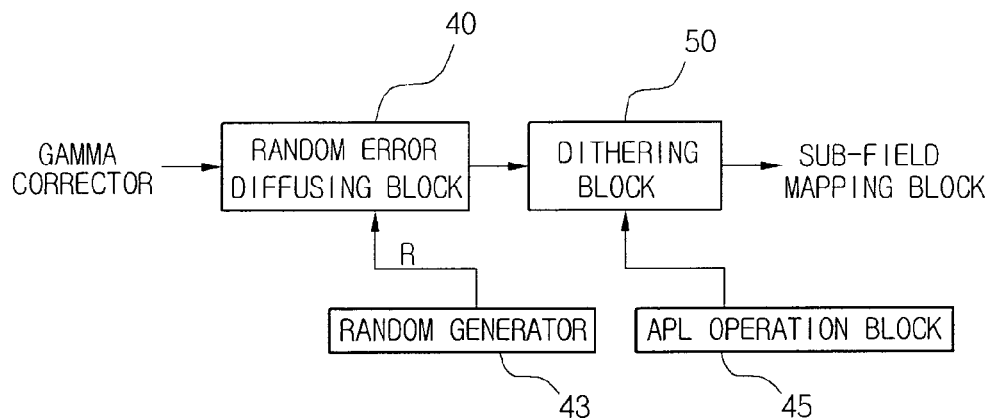
FIG. 5 is a block diagram illustrating a detailed structure of an error diffusing/dithering block shown in FIG. 4.

FIG. 5 is a block diagram illustrating a detailed structure of the error diffusing/dithering block shown in FIG. 4.

Referring to FIG. 5, the error diffusing/dithering block 32 includes a random generator 43, an average picture level (APL) operation block 45, a random error diffusing block 40 and a dithering block 50. Here, the APL operation block 45 may either be included in the error diffusing/dithering block 32 or may be separately equipped at the outside.

The random generator 43 generates random coefficients R1 and R2 and provides the generated random coefficients to the random error diffusing block 40. These random coefficients R1 and R2 are used for random error diffusing.

Figure 7:
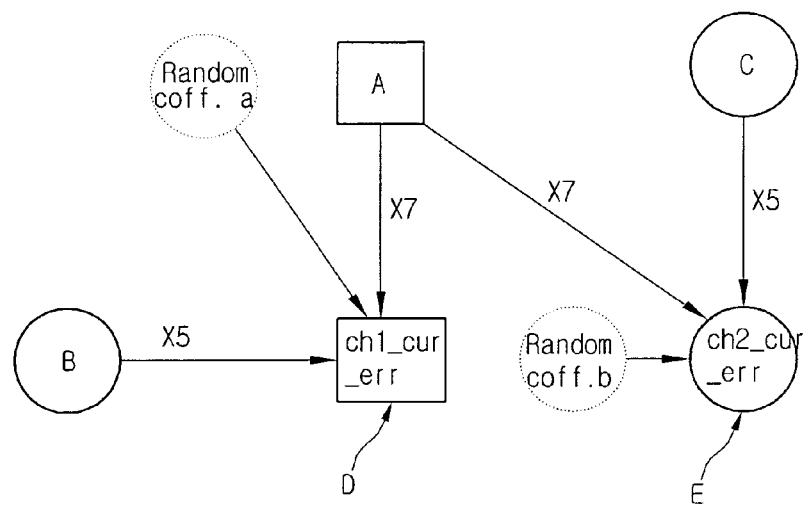
FIG. 7 is a diagram illustrating an error diffusion method in an random error diffuser shown in FIG. 5.

The random error diffusing block 40 generates a carry signal by adding an error diffusion coefficient, which is calculated by giving predetermined different weights depending on video data outputted from the gamma corrector 30, a current pixel value and a random coefficient. As shown in FIG. 7, by using pixels A and B neighboring a current pixel D and pixels A and C neighboring a current pixel E, respective carry values of the current pixels D and E are expressed as the following Equation (1).

$$E.D\ Carry\ ch1(D) = Random\ coff.a + A \times 7 + B \times 5 + ch1\_cur\_err$$

$$E.D\ Carry\ ch2(E) = Random\ coff.b + A \times 7 + C \times 5 + ch2\_cur\_err \quad (1)$$

Here, 'Random coff.a' and 'Random coff.a' respectively represent the random coefficients R1 and R2, and 'A', 'B' and 'C' respectively represent random error diffusion values of the pixels A, B and C, and 'ch1_cur_err' and 'ch2_cur_err' respectively represent the current pixel values of the pixels D and E.

As shown in Equation (1), the carry signal is generated by adding respective error diffusion coefficients, which are calculated by respectively multiplying random error diffusion values of neighboring pixels by different weights, random coefficient R, and current pixel value.

For example, a random error diffusion value of the pixel D is calculated by multiplying lower 5 bits of a decimal part of 'A' by a weight 7 and multiplying lower 5 bits of a decimal part of 'B' by a weight 5 and then adding the two resulting values, as shown in Equation (1). In this manner, a carry signal of the pixel D is calculated by adding the random error diffusion value, the first random coefficient R1 and the current pixel value of the pixel D. At this time, an uppermost bit of the lower 5 bits generates a carry signal '0' or '1'. The so-generated carry signal added to an upper 3 bits of a decimal part of 'D', whereby a random error diffusion value of 11 bits (8 bits of a integer part+3 bits of a decimal part) is outputted to the dithering block 50.

The dithering block 50 dithers the random error diffusion value from the random error diffusing block 40 by using an APL mask selected according to a dithering mask pattern and an APL value calculated by the APL operation block 45, and thereby outputs a pixel value whose bit number is decreased to the sub-field mapping block 34.

Figure 8:
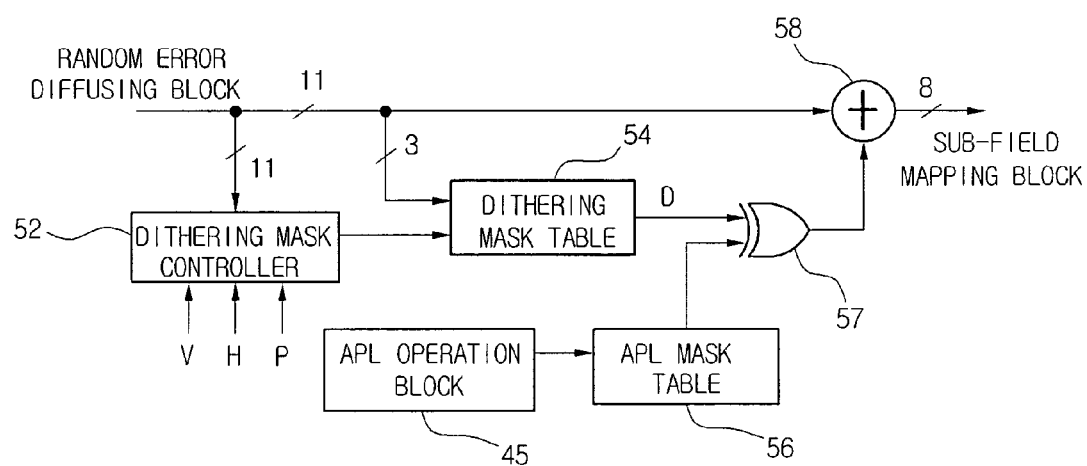
FIG. 8 is a block diagram illustrating a structure of a dithering block shown in FIG. 5.

For this, the dithering block 50 includes a dithering mask controller 52, a dithering mask table 54, an APL mask table 56, an exclusive OR (XOR) gate 57 and an adder 58 as shown in FIG. 8.

The dithering mask controller 52 counts a vertical synchronization signal (V) received from an outside controller (not shown) to thereby indicate a corresponding frame out of 4 frames 1F through 4F, and counts a horizontal synchronization signal (H) and a pixel clock signal (P) to thereby indicate horizontal and vertical lines (i.e. a cell position) in the corresponding frame.

Figure 9:
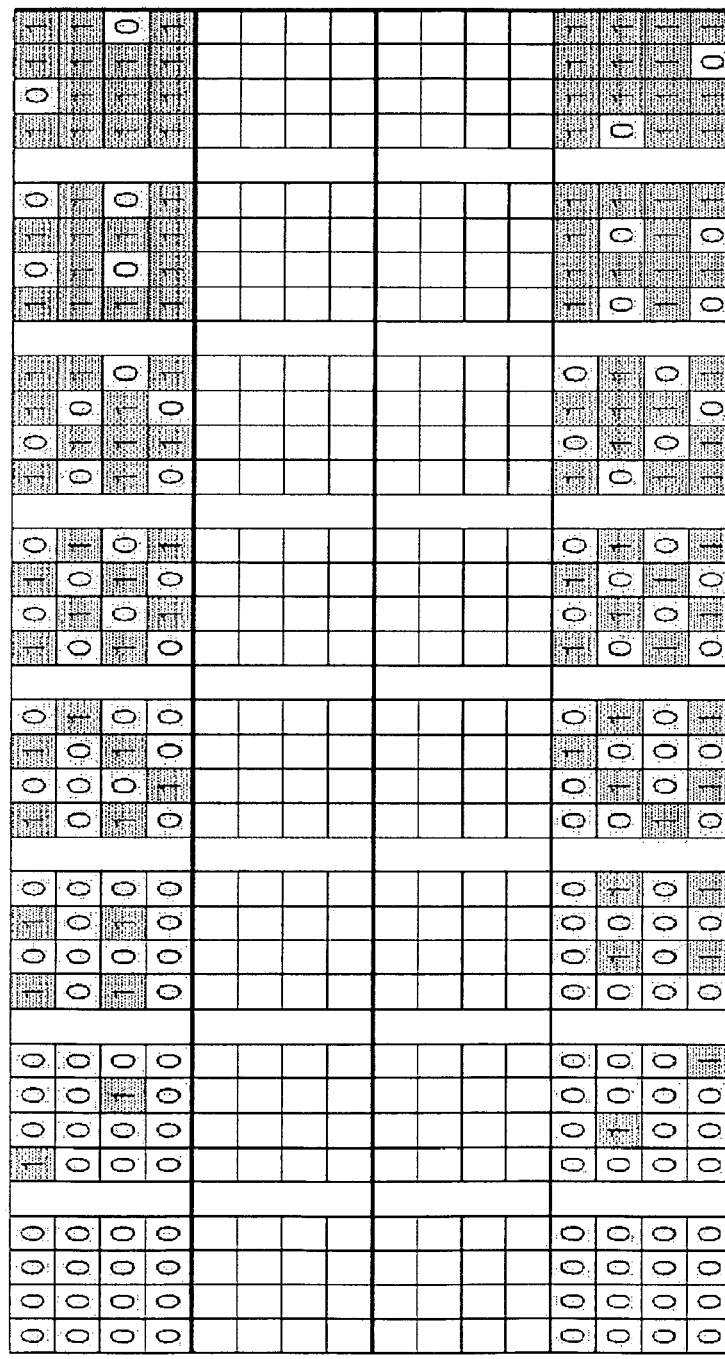
FIG. 9 is a diagram illustrating a dithering mask pattern stored in a dithering mask table shown in FIG. 8.

The dithering mask table 54 stores dithering mask patterns different from one another by gray scales and frames. For example, as shown in FIG. 9, dithering mask patterns, each of which has the size of 4×4 cells, are classified by 8 gray scales of 0 through 7/8 corresponding to upper 3 bits of a decimal part of a random error diffusion value, and each of the resulting 8 dithering mask patterns is reclassified by the 4 frames 1F through 4F, whereby a total of 32 dithering mask patterns are stored in the dithering mask table 54. Although dithering mask patterns set to '0' or '1' in the frames 2F and 3F are not shown in FIG. 9 for simplicity, dithering mask patterns, which are set to '0' or '1' in such a way as that of the frames 1F and 4F, are included in the frames 2F and 3F. Referring to FIG. 9, in respective dithering mask patterns of gray scales 0 through 7/8, the number of cells set to a dither value '1' increases in order of 0, 2, 4, 6, 8, 10, 12 and 14. Additionally, positions of cells set to a dithering value "1" vary by the 4 frames 1F through 4F. Positions of dithering values "is" in respective dithering mask patterns may vary depending on designer's requests. According to these dithering mask patterns, positions of on-cells corresponding to dithering values '1s' can be controlled in time and space. Also, positions of dithering values '1s' in dithering mask patterns vary by gray scales and frames, whereby an error diffusion noise caused by repetition of a constant dithering mask pattern, such as a lattice noise, can be decreased. Furthermore, dithering mask patterns different from one another by R (red), G (green) and B (blue) pixels may be stored in the dithering mask table 54 so as to further decrease a noise caused by a dither mask pattern.

The dithering mask table 54 storing the aforementioned dithering mask patterns receives a random error diffusion value, for example, upper 3 bits of a decimal part out of a pixel value of 11 bits (8 bits of an integer part+3 bits of a decimal part) from the random error diffusing block 40 to then select a dithering mask pattern corresponding to a gray scale of the upper 3 bits.

That is, the dithering mask table 54 selects a dithering mask pattern of a gray scale corresponding to the received upper 3 bits out of the dithering mask patterns shown in FIG. 9. Thereafter, the dithering mask table 54 selects a dithering value D corresponding to a position of a frame and a cell indicated by the dithering mask controller 52 out of the selected dithering mask pattern to then output the selected dithering value D to the XOR gate 57. Meanwhile, an APL mask selected out of the APL mask table 56 is inputted to the XOR gate 57. That is, at least one or more APL masks are stored in the APL mask table 56 so that one of the stored APL mask is selected according to an APL value outputted from the APL operation block 45. For example, if APL values are within the range of 0 through 100, respective APL masks are set and stored in the APL mask table 56 so that APL values 0 through 25 correspond to an APL mask 1, APL values 26 through 50 correspond to an APL mask 2, APL values 51 through 75 correspond to an APL mask 3, and APL values 76 through 100 correspond to an APL mask 4. Of course, if APL values are further subdivided, more APL masks can be set. At this time, it is preferable that the APL mask values are set to be proportional to the APL values.

That is, according as an APL value increases, more '1's are set in a corresponding APL mask.

In this manner, a dithering mask selected out of the dithering mask table 54 and an APL mask value are inputted to the XOR gate 57, and are then XORed in the XOR gate 57. The XORed value is inputted to the adder 58.

The adder 58 adds the XORed value outputted from the XOR gate 56 and the random error diffusion value outputted from the random error diffusing block 40 to then provide the added value to the sub-field mapping block 34.

In this manner, the gray scale processing apparatus and method according to the present invention randomly error-diffuses a pixel value whose bit number is extended from 8 to 16 by inverse gamma correction, and performs dithering by using APL mask values different from one another according to APL values, and thereby can remove a noise such as a pattern caused by error diffusion.

Figure 10:
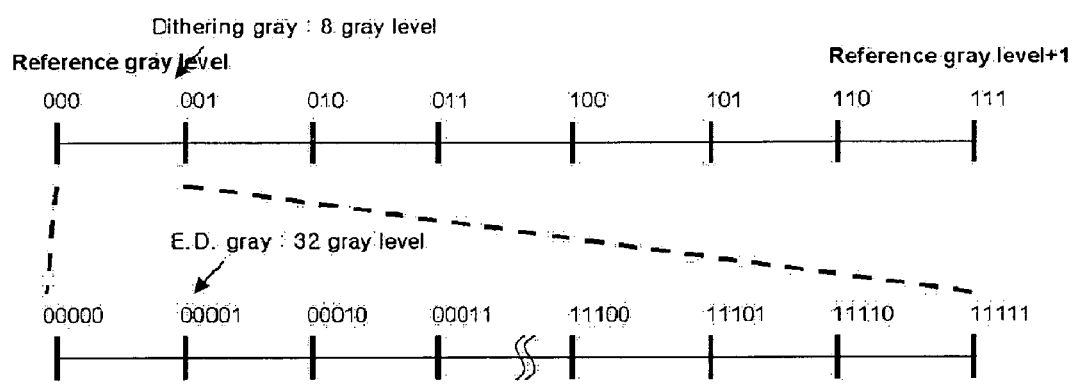
FIG. 10 is a diagram illustrating a method in which a gray scale expression is increased by the error diffusing/dithering block shown in FIG. 4.

The gray scale processing apparatus and method subdivides gray scales between basic gray scales by performing at the dithering block 50 a dithering by using the dithering mask patterns shown in FIG. 9, and thereby can increase the number of expressible gray scales. This is possible by combination of data '1s' that are dispersed in space and time, such as the dithering mask patterns shown in FIG. 9. For example, the present invention represents 256 basic gray scales by using an 8-bit pixel value finally generated by an error diffusing and dithering operation. If 8 gray scales are represented by the dithering and 32 gray scales are represented by the random error diffusing as shown in FIG. 10, a total of 256 gray scales can be represented.

As stated above, the gray scale processing apparatus and method according to the present invention randomly error-diffuses video data by using random coefficients and performs a dithering by using different APL mask values according to APL values, and thereby can enhance a gray scale expression and minimize an error diffusion noise.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for processing a gray scale in a display device that displays video data, the method comprising:
    randomly error-diffusing the video data by using random coefficients; and
    dithering the error-diffused video data by using an average picture level (APL) mask,
    wherein the video data is data that is inversely gamma-corrected and has an integer part and a decimal part that comprises upper part bits and lower part bits, the upper part bits being used only for the dithering, the lower part bits being used only for the random error diffusing.

2. The method according to claim 1, wherein the APL mask comprises at least one or more masks corresponding to APL values.

3. The method according to claim 1, wherein the APL mask has mask values proportional to APL values.

4. The method according to claim 1, wherein the randomly error-diffusing comprises:
    generating a carry signal by adding error diffusion coefficients, a current pixel value and the random coefficient, the error diffusion coefficients being obtained by respectively giving predetermined different weights to error diffusion values of a neighboring pixel of the video data; and
    adding the carry signal to upper part bits of the current pixel and outputting the resulting value.

5. The method according to claim 4, wherein the generating and the adding are identically performed with respect to respective pixels of the video data.

6. The method according to claim 1, wherein the dithering comprises:
    selecting a dithering mask pattern corresponding to the random error diffusion value;
    XORing a dithering value of the selected dithering mask pattern and the APL mask; and
    adding the XORed value to the random error diffusing value and outputting the resulting value.

7. The method according to claim 6, wherein the selected dithering mask pattern is outputted depending on a combination of a vertical synchronization signal, a horizontal synchronization signal and a pixel clock signal.

8. The method according to claim 6, wherein the dithering mask pattern is selected by a gray scale value corresponding to upper part bits of a decimal part of the random error diffusion value.

9. The method according to claim 6, wherein the dithering mask pattern is set by gray scales and frames.

10. An apparatus for processing a gray scale in a display device that displays video data, the apparatus comprising:
    a random error diffusing block for randomly error-diffusing the video data by using random coefficients;
    a dithering block for dithering the error-diffused video data by using an average picture level (APL) mask; and
    a gamma corrector for inversely gamma-correcting the video data to thereby cause the video data to have an integer part and a decimal part, wherein the decimal part comprises upper part bits and lower part bits, the upper part bits being used only for the dithering, and the lower part bits being used only for the random error diffusing.

11. The apparatus according to claim 10, further comprising a random generator for generating a random coefficient and providing the random coefficient to the random error diffusing block.

12. The apparatus according to claim 10, further comprising an APL operation block for calculating an APL value of the video data.

13. The apparatus according to claim 10, wherein the random error diffusing block generates a carry signal by adding error diffusion coefficients, a current pixel value and the random coefficient, the error diffusion coefficients being obtained by respectively giving predetermined different weights to error diffusion values of a neighboring pixel of the video data, and the random error diffusing block adds the carry signal to upper part bits of the current pixel and outputs the resulting value.

14. The apparatus according to claim 10, wherein the dithering block comprises:
    a dithering mask table for selecting a dithering mask pattern corresponding to the random error diffusion value;
    an XOR gate for XORing a dithering value of the selected dithering mask pattern and the APL mask; and
    an adder for adding the XORed value to the random error diffusing value.

15. The apparatus according to claim 14, wherein the selected dithering mask pattern is outputted according to a combination of a vertical synchronization signal, a horizontal synchronization signal and a pixel clock signal.

16. The apparatus according to claim 14, wherein the dithering mask pattern is selected by a gray scale value corresponding to upper part bits of a decimal part of the random error diffusion value.

17. The apparatus according to claim 14, wherein the dithering mask pattern is set by gray scales and frames.

18. The apparatus according to claim 10, wherein the dithering block selects one of APL masks depending on APL values outputted from the APL operation block and uses the selected one for dithering.

* * * * *